(12) United States Patent
Tsai

(10) Patent No.: US 12,550,218 B2
(45) Date of Patent: Feb. 10, 2026

(54) APPARATUSES AND METHODS FOR ENABLING SECONDARY CELL GROUP (SCG) SUSPENSION AND RESUMPTION OR PRIMARY SECONDARY CELL (PSCELL) DEACTIVATION AND ACTIVATION

(71) Applicant: MEDIATEK INC., Hsinchu (TW)

(72) Inventor: Chun-Fan Tsai, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 571 days.

(21) Appl. No.: 17/626,386

(22) PCT Filed: Oct. 14, 2020

(86) PCT No.: PCT/CN2020/120798
§ 371 (c)(1),
(2) Date: Jan. 11, 2022

(87) PCT Pub. No.: WO2021/088606
PCT Pub. Date: May 14, 2021

(65) Prior Publication Data
US 2022/0264686 A1    Aug. 18, 2022

Related U.S. Application Data

(60) Provisional application No. 62/931,896, filed on Nov. 7, 2019.

(51) Int. Cl.
*H04W 76/19* (2018.01)
*H04W 74/0833* (2024.01)
(Continued)

(52) U.S. Cl.
CPC ....... *H04W 76/19* (2018.02); *H04W 74/0833* (2013.01); *H04W 74/0841* (2013.01);
(Continued)

(58) Field of Classification Search
None
See application file for complete search history.

(56) References Cited

U.S. PATENT DOCUMENTS 11,470,517 B2 *  10/2022  Saily ............... H04W 36/305
2019/0182881 A1   6/2019  Teyeb et al.
(Continued)

FOREIGN PATENT DOCUMENTS

CN    105451364 A    3/2016
CN    105637967 A    6/2016
(Continued)

OTHER PUBLICATIONS

3GPP TS 36.331 V14.12.0 (Sep. 2019).*
(Continued)

*Primary Examiner* — Lance Leonard Barry
(74) *Attorney, Agent, or Firm* — McClure, Qualey & Rodack, LLP

(57) ABSTRACT

A method, executed by a User Equipment (UE) communicatively connected to a Secondary Cell Group (SCG) of a mobile communication network, is provided. The method includes the following steps: receiving a first Radio Resource Control (RRC) message or a Media Access Control (MAC) Control Element (CE) including an indicator for suspension or resumption of the SCG or for deactivation or activation of a Primary Secondary Cell (PSCell) of the SCG from the mobile communication network; suspending SCG transmission for all radio bearers in response to the first RRC message or the MAC CE including an indicator for suspension of the SCG or deactivation of the PSCell; and resuming SCG transmission for all radio bearers in response to the first RRC message or the MAC CE including an indicator for resumption of the SCG or activation of the PSCell.

2 Claims, 7 Drawing Sheets

(51) Int. Cl.
  *H04W 76/20*  (2018.01)
  *H04W 76/27*  (2018.01)
  *H04W 80/02*  (2009.01)

(52) U.S. Cl.
  CPC .......... *H04W 76/20* (2018.02); *H04W 76/27* (2018.02); *H04W 80/02* (2013.01)

(56) References Cited

U.S. PATENT DOCUMENTS

| | | | |
|---|---|---|---|
| 2020/0029239 A1* | 1/2020 | Chen | H04W 76/19 |
| 2020/0344629 A1* | 10/2020 | Kim | H04W 48/16 |
| 2022/0046747 A1* | 2/2022 | Da Silva | H04W 52/0229 |
| 2022/0116874 A1* | 4/2022 | Xu | H04W 52/0225 |
| 2022/0117022 A1* | 4/2022 | Cheng | H04W 76/19 |
| 2022/0141904 A1* | 5/2022 | Yilmaz | H04L 5/0035 370/329 |
| 2022/0330155 A1* | 10/2022 | Cheng | H04W 72/0453 |

FOREIGN PATENT DOCUMENTS

| | | | |
|---|---|---|---|
| WO | WO-2015170476 A1 * | 11/2015 | ................ H04J 1/00 |
| WO | WO-2019245335 A1 * | 12/2019 | ........ H04W 12/0433 |

OTHER PUBLICATIONS

3GPP TS 36.331 v. 14.12.0 (Year: 2019).*
International Search Report and Written Opinion dated Jan. 13, 2021, issued in application No. PCT/CN2020/120798.
"FFS issues on early measurement reporting;" 3GPP TSG-RAN WG2#106 R2-1907479; May 2019; pp. 1-4.
"Direct CA or DC Activation and Deactivation;" 3GPP TSG-RAN WG2 Meeting #106 R2-1905880; May 2019; pp. 1-2.
Chinese language office action dated May 11, 2023, issued in application No. CN 202080049928.2.

* cited by examiner

APPARATUSES AND METHODS FOR ENABLING SECONDARY CELL GROUP (SCG) SUSPENSION AND RESUMPTION OR PRIMARY SECONDARY CELL (PSCELL) DEACTIVATION AND ACTIVATION

CROSS REFERENCE TO RELATED APPLICATIONS

This application claims priority of U.S. Provisional Application No. 62/931,896, filed on Nov. 7, 2019, the entirety of which is incorporated by reference herein.

TECHNICAL FIELD

The application generally relates to mobile communications and, more particularly, to apparatuses and methods for enabling Secondary Cell Group (SCG) suspension and resumption or Primary Secondary Cell (PSCell) deactivation and activation.

BACKGROUND

In a typical mobile communication environment, a User Equipment (UE) (also called Mobile Station (MS)), such as a mobile telephone (also known as a cellular or cell phone), or a tablet Personal Computer (PC) with wireless communications capability, may communicate voice and/or data signals to one or more mobile communication networks. The wireless communications between the UE and the mobile communication networks may be performed using various Radio Access Technologies (RATs), such as Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced (LTE-A) technology, etc. In particular, GSM/GPRS/EDGE technology is also called 2G cellular technology; WCDMA/CDMA-2000/TD-SCDMA technology is also called 3G cellular technology; and LTE/LTE-A/TD-LTE technology is also called 4G cellular technology.

These wireless technologies have been adopted for use in various telecommunication standards to provide a common protocol that enables different wireless devices to communicate on a municipal, national, regional, and even global level. An example of an emerging telecommunication standard is the 5G New Radio (NR). The 5G NR is a set of enhancements to the LTE mobile standard promulgated by the Third Generation Partnership Project (3GPP). It is designed to better support mobile broadband Internet access by improving spectral efficiency, reducing costs, and improving services.

In order to meet the demand for higher data rates in wireless communications, support for wider transmission bandwidths is required, and the so-called Dual Connectivity (DC) technique has been proposed to allow for the expansion of effective bandwidths delivered to a UE. Using the DC technique, a UE may perform data transceiving simultaneously with two base stations, e.g., a macro base station (also called the Master Node (MN)) and a micro base station (also called the Secondary Node (SN)). The set of Serving cells (SCells) under control of the MN is defined as a Master Cell Group (MCG), while the set of SCells under control of the SN is defined as a Secondary Cell Group (SCG). In a SCG, one of the SCells is configured as the Primary SCell (PSCell) on which main control procedures for the SCG are performed, and the rest SCells may be configured to provide additional radio resources on top of the PSCell in the SCG.

According to the 3rd Generation Partnership Project (3GPP) specification in compliance with the 4G LTE or 5G NR technology, an SCell may be activated or deactivated by the network based on various reasons, such as UE's traffic pattern, while the PSCell has to remain in the activated state. However, the need for data transmission on the SCG is not always exist. As a result, keeping the PSCell activated for all times as long as the SCG is configured will inevitably cause unnecessary power consumption and reduce the UE's battery life.

SUMMARY

In order to solve the aforementioned problem, the present application proposes to allow deactivation and activation of a PSCell or suspension and resumption of an SCG, by providing an indicator for suspension/resumption of the SCG or for deactivation/activation of the PSCell in a Radio Resource Control (RRC) message or a Media Access Control (MAC) Control Element (CE) to the UE. Moreover, the present application also proposes an enhanced RRC connection resume procedure in which an indicator for keeping the SCG suspended is provided, so that the SCG remains suspended before the early measurement reporting is completed through the RRC Resume Complete message.

In one aspect of the application, a method, executed by a UE communicatively connected to an SCG of a mobile communication network, is provided. The method comprises the following steps: receiving a first RRC message or a MAC CE comprising an indicator for suspension or resumption of the SCG or for deactivation or activation of a PSCell of the SCG from the mobile communication network; suspending SCG transmission for all radio bearers in response to the first RRC message or the MAC CE comprising an indicator for suspension of the SCG or deactivation of the PSCell; and resuming SCG transmission for all radio bearers in response to the first RRC message or the MAC CE comprising an indicator for resumption of the SCG or activation of the PSCell.

In a further embodiment of the first aspect, the method further comprises the following steps: deactivating the PSCell and all SCells of the SCG in response to the first RRC message or the MAC CE comprising an indicator for suspension of the SCG or deactivation of the PSCell; and keeping SCG configurations and stopping Physical Downlink Control Channel (PDCCH) monitoring for the PSCell in response to deactivating the PSCell.

In a further embodiment of the first aspect, the method further comprises the following steps: activating the PSCell and performing a Random Access (RA) procedure on the PSCell in response to the first RRC message or the MAC CE comprising an indicator for resumption of the SCG or activation of the PSCell; and starting PDCCH monitoring for the PSCell in response to activating the PSCell.

In a further embodiment of the first aspect, the method further comprises: sending a second RRC message to the mobile communication network in response to receiving the first RRC message comprising an indicator for suspension or resumption of the SCG or for deactivation or activation of the PSCell.

In a further embodiment of the previous embodiment of the first aspect, the first RRC message is an RRC Reconfiguration message, and the second RRC message is an RRC Reconfiguration Complete message.

In a further embodiment of the first aspect, the mobile communication network is a 5G NR network.

In a second aspect of the application, a method, executed by a UE communicatively connected to an SCG of a mobile communication network, is provided. The method comprises the following steps: in response to the UE being in an RRC_INACTIVE mode and the SCG being suspended, receiving an RRC Resume message comprising a first indicator for the UE to keep the SCG suspended from the mobile communication network; keeping the SCG suspended in response to the RRC Resume message comprising the first indicator; and sending an RRC Resume Complete message comprising measurement results of a PSCell of the SCG to the mobile communication network.

In a further embodiment of the second aspect, the method further comprises the following steps: entering an RRC_CONNECTED mode from the RRC_INACTIVE mode in response to sending the RRC Resume Complete message; after entering the RRC_CONNECTED mode, receiving an RRC Reconfiguration message or a MAC CE comprising a second indicator for resumption of the SCG from the mobile communication network; and resuming SCG transmission for all radio bearers in response to the RRC Reconfiguration message or the MAC CE comprising the second indicator.

In a further embodiment of the second aspect, the method further comprises the following steps: activating the PSCell and performing an RA procedure on the PSCell in response to the RRC Reconfiguration message or the MAC CE comprising the second indicator; and starting PDCCH monitoring for the PSCell in response to activating the PSCell.

In a further embodiment of the second aspect, the RRC Resume message further comprises a third indicator for the UE to keep SCG configurations, and the method further comprises: keeping the SCG configurations while keeping the SCG suspended in response to the RRC Resume message.

In a further embodiment of the previous embodiment of the second aspect, the third indicator is a restoreSCG Information Element (IE) indicating not to release the SCG configurations.

In a further embodiment of the second aspect, the UE is also communicatively connected to an MCG of the mobile communication network or another mobile communication network.

In a further embodiment of the previous embodiment of the second aspect, the mobile communication network is a 5G NR network, and the other mobile communication network is a 4G LTE network.

In a third aspect of the application, a UE comprising a wireless transceiver and a controller is provided. The wireless transceiver is configured to perform wireless transmission and reception to and from an SCG of a mobile communication network. The controller is configured to: in response to the UE being in an RRC_INACTIVE mode and the SCG being suspended, receive an RRC Resume message comprising a first indicator for the UE to keep the SCG suspended from the mobile communication network via the wireless transceiver; keep the SCG suspended in response to the RRC Resume message comprising the first indicator; and send an RRC Resume Complete message comprising measurement results of a PSCell of the SCG to the mobile communication network via the wireless transceiver.

In a further embodiment of the third aspect, the controller is further configured to: configure the UE to enter an RRC_CONNECTED mode from the RRC_INACTIVE mode in response to sending the RRC Resume Complete message; after the UE enters the RRC_CONNECTED mode, receive an RRC Reconfiguration message or a MAC CE comprising a second indicator for resumption of the SCG from the mobile communication network via the wireless transceiver; and resume SCG transmission for all radio bearers in response to the RRC Reconfiguration message or the MAC CE comprising the second indicator.

In a further embodiment of the previous embodiment of the third aspect, the controller is further configured to: activate the PSCell and performing an RA procedure on the PSCell in response to the RRC Reconfiguration message or the MAC CE comprising the second indicator; and start PDCCH monitoring for the PSCell in response to activating the PSCell.

In a further embodiment of the third aspect, the RRC Resume message further comprises a third indicator for the UE to keep SCG configurations, and the controller is further configured to: keep the SCG configurations while keeping the SCG suspended in response to the RRC Resume message.

In a further embodiment of the previous embodiment of the third aspect, the third indicator is a restoreSCG IE indicating not to release the SCG configurations.

In a further embodiment of the third aspect, the UE is also communicatively connected to an MCG of the mobile communication network or another mobile communication network.

In a further embodiment of the previous embodiment of the third aspect, the mobile communication network is a 5G NR network, and the other mobile communication network is a 4G LTE network.

Other aspects and features of the present application will become apparent to those with ordinarily skill in the art upon review of the following descriptions of specific embodiments of the methods and UEs for enabling SCG suspension and resumption or PSCell deactivation and activation.

BRIEF DESCRIPTION OF THE DRAWINGS

The application can be more fully understood by reading the subsequent detailed description and examples with references made to the accompanying drawings, wherein.

DETAILED DESCRIPTION OF PREFERRED IMPLEMENTATIONS

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
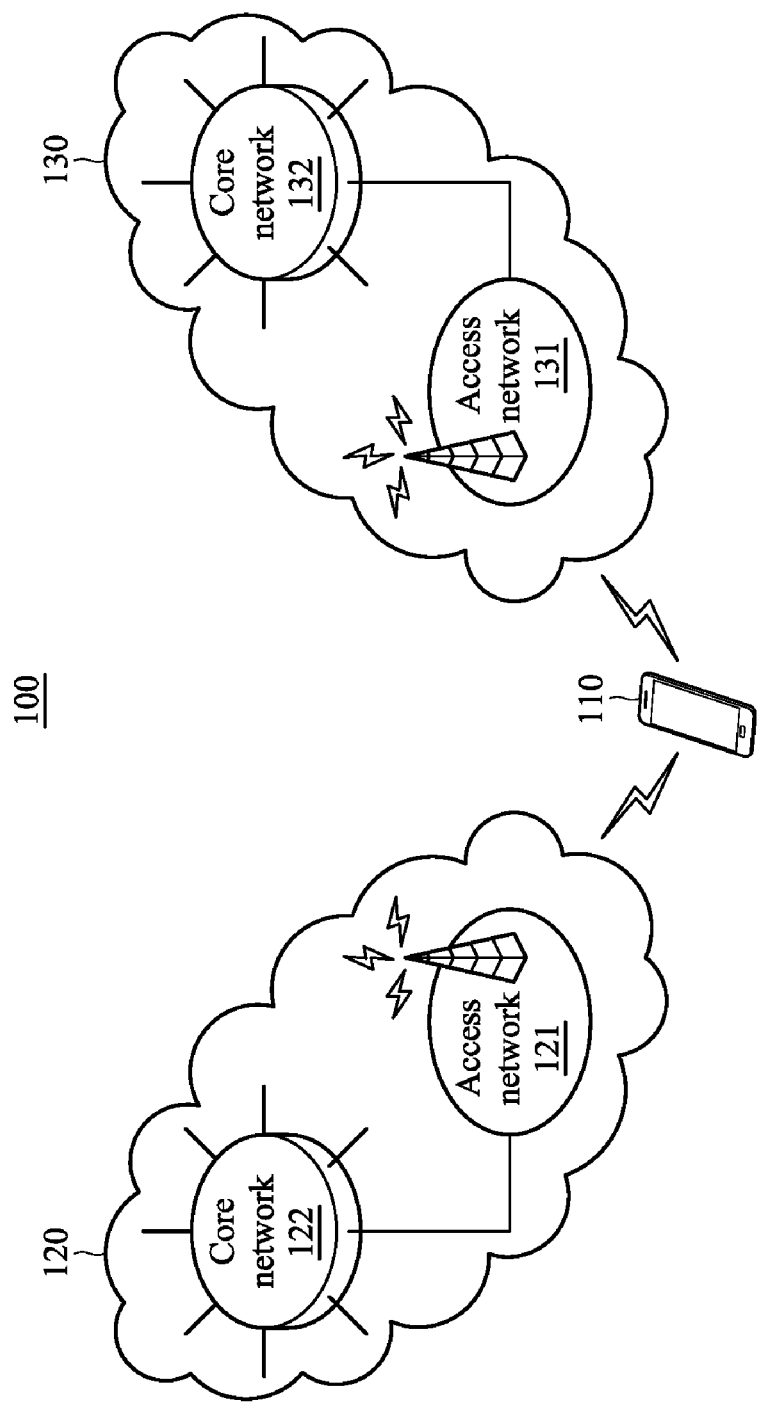
FIG. 1 is a block diagram of a wireless communication environment according to an embodiment of the application.

FIG. 1 is a block diagram of a wireless communication environment according to an embodiment of the application.

As shown in FIG. 1, the mobile communication environment 100 may include a User Equipment (UE) 110 and two mobile communication networks 120 and 130, wherein the UE 110 may be selectively connected to one or both of the mobile communication networks 120 and 130 for obtaining mobile services. For example, when using the DC technique, the UE 110 may be communicatively connected to a Master Cell Group (MCG) of the mobile communication network 120 and a Secondary Cell Group (SCG) of the mobile communication network 130. Alternatively, both the MCG and the SCG may belong to the same mobile communication network (e.g., the mobile communication network 120 or 130).

The UE 110 may be a feature phone, a smartphone, a tablet Personal Computer (PC), a laptop computer, or any wireless communication device supporting the RATs utilized by the mobile communication networks 120 and 130.

The mobile communication network 120 may include an access network 121 and a core network 122, while the mobile communication network 130 may include an access network 131 and a core network 132. The access networks 121 and 131 are responsible for processing radio signals, terminating radio protocols, and connecting the UE 110 with the core networks 122 and 132, respectively. The core networks 122 and 132 are responsible for performing mobility management, network-side authentication, and interfaces with public/external networks (e.g., the Internet). The access networks 121 and 131, and the core networks 122 and 132 may each include one or more network nodes for carrying out said functions.

For example, the mobile communication network 120/130 may be a 5G NR network, and the access network 121/131 and the core network 122/132 may be a Next Generation Radio Access Network (NG-RAN) and a Next Generation Core Network (NG-CN), respectively.

An NG-RAN may include one or more base stations, such as next generation NodeBs (gNBs), which support high frequency bands (e.g., above 24 GHz), and each gNB may further include one or more Transmission Reception Points (TRPs). Some gNB functions may be distributed across different TRPs, while others may be centralized, leaving the flexibility and scope of specific deployments to fulfill the requirements for specific cases. Each gNB or TRP may be referred to as a 5G base station. Some gNB functions may be distributed across different TRPs, while others may be centralized, leaving the flexibility and scope of specific deployments to fulfill the requirements for specific cases.

A 5G base station may form one or more cells with different Component Carriers (CCs) for providing mobile services to the UE 110. For example, the UE 110 may camp on one or more cells formed by one or more gNBs or TRPs, wherein the cells which the UE 110 is camped on may be referred to as serving cells, including a Primary Cell (PCell) and one or more Secondary Cells (SCells) for an MCG, or a Primary Secondary Cell (PSCell) and one or more SCells for an SCG.

A NG-CN generally consists of various network functions, including Access and Mobility Function (AMF), Session Management Function (SMF), Policy Control Function (PCF), Application Function (AF), Authentication Server Function (AUSF), User Plane Function (UPF), and User Data Management (UDM), wherein each network function may be implemented as a network element on a dedicated hardware, or as a software instance running on a dedicated hardware, or as a virtualized function instantiated on an appropriate platform, e.g., a cloud infrastructure.

The AMF provides UE-based authentication, authorization, mobility management, etc. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functions per session. The AF provides information on the packet flow to PCF responsible for policy control in order to support Quality of Service (QoS). Based on the information, the PCF determines policies about mobility and session management to make the AMF and the SMF operate properly. The AUSF stores data for authentication of UEs, while the UDM stores subscription data of UEs.

For example, the mobile communication network 120/130 may be a 4G LTE network, and the access network 121/131 and the core network 122/132 may be an Evolved-Universal Terrestrial Radio Access Network (E-UTRAN) and an Evolved Packet Core (EPC), respectively.

The E-UTRAN may include at least an evolved NodeB (eNB) (e.g., a macro eNB, femto eNB, or pico eNB). Each eNB may be referred to as a 4G base station.

A 4G base station may form one or more cells with different CCs for providing mobile services to the UE 110. For example, the UE 110 may camp on one or more cells formed by one or more eNBs, wherein the cells which the UE 110 is camped on may be referred to as serving cells, including a PCell and one or more SCells for an MCG, or a PSCell and one or more SCells for an SCG.

The EPC may include a Home Subscriber Server (HSS), Mobility Management Entity (MME), Serving Gateway (S-GW), and Packet Data Network Gateway (PDN-GW or P-GW).

The HSS is a central database that contains user-related and subscription-related information. The functions of the HSS include functionalities such as mobility management, call and session establishment support, user authentication and access authorization.

The MME is responsible for idle mode UE paging and tagging procedures including retransmissions. It is involved in the bearer activation/deactivation process and is also responsible for choosing the S-GW for the UE 110 at the initial attach and at time of intra-LTE handover involving Core Network (CN) node relocation. It is also responsible for user authentication (by interacting with the HSS) and generation/allocation of temporary identities to the UE 110. It is also the termination point in the network for ciphering/integrity protection for Non Access Stratum (NAS) signaling and handles the security key management.

The S-GW is responsible for routing and forwarding user data packets, while also acting as the mobility anchor for the user plane during inter-eNB handovers and as the anchor for mobility between LTE and other 3GPP technologies.

The P-GW provides connectivity from the UE 110 to external PDNs by being the point of exit and entry of traffic for the UE 110. The PGW also provides the functions of policy enforcement, packet filtering for each user, charging support, lawful interception, and packet screening.

It should be understood that the mobile communication environment 100 described in the embodiment of FIG. 1 are for illustrative purposes only and are not intended to limit the scope of the application.

Figure 2:
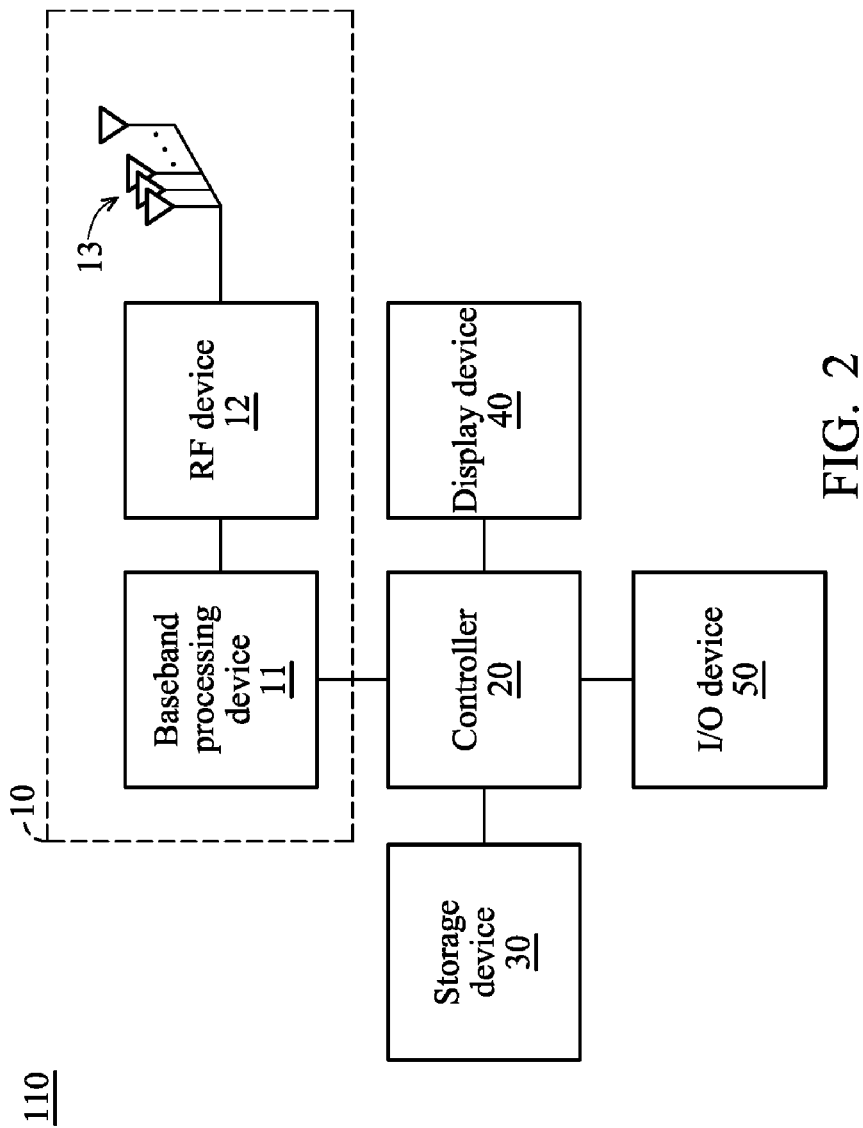
FIG. 2 is a block diagram illustrating the UE 110 according to an embodiment of the application.

FIG. 2 is a block diagram illustrating the UE 110 according to an embodiment of the application.

As shown in FIG. 2, the UE 110 may include a wireless transceiver 10, a controller 20, a storage device 30, a display device 40, and an Input/Output (I/O) device 50.

The wireless transceiver 10 is configured to perform wireless transmission and reception to and from the mobile communication network 120 and/or the mobile communication network 130.

Specifically, the wireless transceiver 10 may include a baseband processing device 11, a Radio Frequency (RF) device 12, and an antenna 13, wherein the antenna 13 may include an antenna array for beamforming.

The baseband processing device 11 is configured to perform baseband signal processing and control the communications between subscriber identity card(s) (not shown) and the RF device 12. The baseband processing device 11 may contain multiple hardware components to perform the baseband signal processing, including Analog-to-Digital Conversion (ADC)/Digital-to-Analog Conversion (DAC), gain adjusting, modulation/demodulation, encoding/decoding, and so on.

The RF device 12 may receive RF wireless signals via the antenna 13, convert the received RF wireless signals to baseband signals, which are processed by the baseband processing device 11, or receive baseband signals from the baseband processing device 11 and convert the received baseband signals to RF wireless signals, which are later transmitted via the antenna 13. The RF device 12 may also contain multiple hardware devices to perform radio frequency conversion. For example, the RF device 12 may comprise a mixer to multiply the baseband signals with a carrier oscillated in the radio frequency of the supported RAT(s), wherein the radio frequency may be any radio frequency (e.g., 30 GHz-300 GHz for mmWave) utilized in the 5G NR technology, or may be 900 MHz, 2100 MHz, or 2.6 GHz utilized in 4G LTE/LTE-A/TD-LTE technology, or another radio frequency, depending on the RAT in use.

The controller 20 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 10 for wireless communication with the mobile communication network 120 and/or the mobile communication network 130, storing and retrieving data (e.g., program code) to and from the storage device 30, sending a series of frame data (e.g. representing text messages, graphics, images, etc.) to the display device 40, and receiving user inputs or outputting signals via the I/O device 50.

In particular, the controller 20 coordinates the aforementioned operations of the wireless transceiver 10, the storage device 30, the display device 40, and the I/O device 50 for performing the method of the present application.

In another embodiment, the controller 20 may be incorporated into the baseband processing device 11, to serve as a baseband processor.

As will be appreciated by persons skilled in the art, the circuits of the controller 20 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 may be a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing data (e.g., SCG configurations), instructions, and/or program code of applications, communication protocols, and/or the method of the present application.

The display device 40 may be a Liquid-Crystal Display (LCD), a Light-Emitting Diode (LED) display, an Organic LED (OLED) display, or an Electronic Paper Display (EPD), etc., for providing a display function. Alternatively, the display device 40 may further include one or more touch sensors disposed thereon or thereunder for sensing touches, contacts, or approximations of objects, such as fingers or styluses.

The I/O device 50 may include one or more buttons, a keyboard, a mouse, a touch pad, a video camera, a microphone, and/or a speaker, etc., to serve as the Man-Machine Interface (MMI) for interaction with users.

It should be understood that the components described in the embodiment of FIG. 2 are for illustrative purposes only and are not intended to limit the scope of the application.

For example, a UE may include more components, such as a power supply, a Global Positioning System (GPS) device, and/or an additional wireless transceiver. The power supply may be a mobile/replaceable battery providing power to all the other components of the UE 110. The GPS device may provide the location information of the UE 110 for use by some location-based services or applications. In case the UE 110 supports multi-RAT Dual Connectivity (MR-DC), the wireless transceiver 10 may be used for wireless transmission and reception to and from a 5G NR network, while an additional wireless transceiver may be used for wireless transmission and reception to and from a 4G LTE network. Alternatively, a UE may include fewer components. For example, the UE may not include the display device 40 and/or the I/O device 50.

Figure 3:
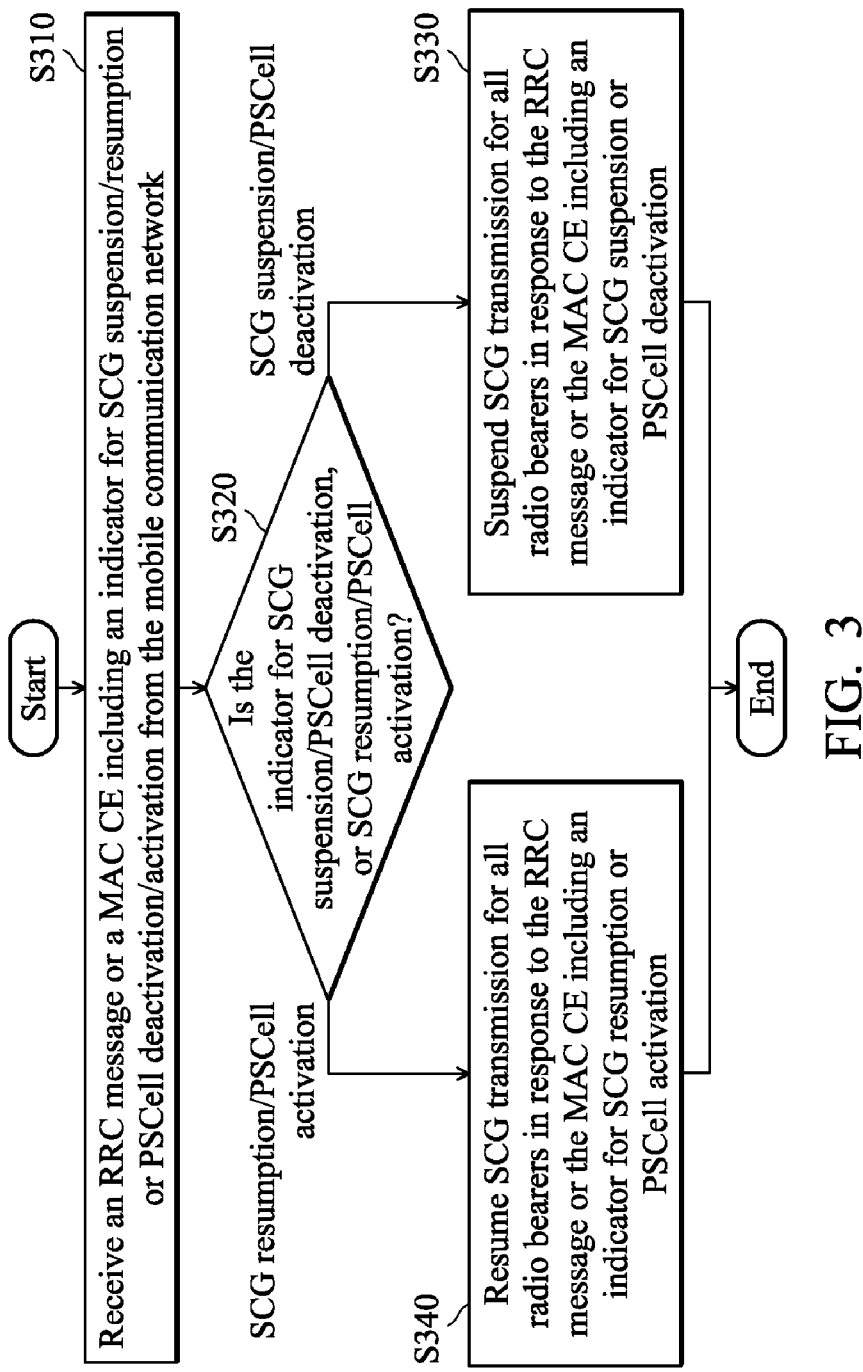
FIG. 3 is a flow chart illustrating the method for enabling SCG suspension and resumption or PSCell deactivation and activation according to an embodiment of the application.

FIG. 3 is a flow chart illustrating the method for enabling SCG suspension and resumption or PSCell deactivation and activation according to an embodiment of the application.

In this embodiment, the method may be applied to and executed by a UE (e.g., the UE 110) wirelessly and communicatively connected to an SCG of a mobile communication network (e.g., the mobile communication network 120/130). In particular, the UE is in the RRC_CONNECTED mode.

In step S310, the UE receives an RRC message or a MAC CE including an indicator for suspension or resumption of the SCG or for deactivation or activation of a PSCell of the SCG from the mobile communication network.

In one embodiment, the RRC message may be an RRC Reconfiguration message.

Specifically, the indicator may be a new Information Element (IE) dedicated for indicating SCG suspension/resumption or PSCell deactivation/activation, in addition to the existing IEs defined for the RRC Reconfiguration message or the MAC CE in compliance with the published 3GPP Technical Specification (TS) 38.331 and TS 38.321.

Please note that the 3GPP specifications mentioned herein are used to teach the spirit of the application, and the application should not be limited thereto.

In step S320, the UE determines whether the indicator is for suspension of the SCG or deactivation of the PSCell, or for resumption of the SCG or activation of the PSCell.

Subsequent to step S320, if the indicator is for suspension of the SCG or deactivation of the PSCell, the method proceeds to step S330.

In step S330, the UE suspends SCG transmission for all radio bearers in response to the RRC message or the MAC CE including an indicator for suspension of the SCG or deactivation of the PSCell.

In one embodiment, the UE may further deactivate the PSCell and all SCells of the SCG in response to the RRC message or the MAC CE including an indicator for suspension of the SCG or deactivation of the PSCell, and keep SCG configurations and stop Physical Downlink Control Channel (PDCCH) monitoring for the PSCell in response to deactivating the PSCell.

Subsequent to step S320, if the indicator is for resumption of the SCG or activation of the PSCell, the method proceeds to step S340.

In step S340, the UE resumes SCG transmission for all radio bearers in response to the RRC message or the MAC CE including an indicator for resumption of the SCG or activation of the PSCell.

In one embodiment, the UE may further activate the PSCell and perform a Random Access (RA) procedure on the PSCell in response to the RRC message or the MAC CE including an indicator for resumption of the SCG or activation of the PSCell, and start PDCCH monitoring for the PSCell in response to activating the PSCell.

Figure 4:
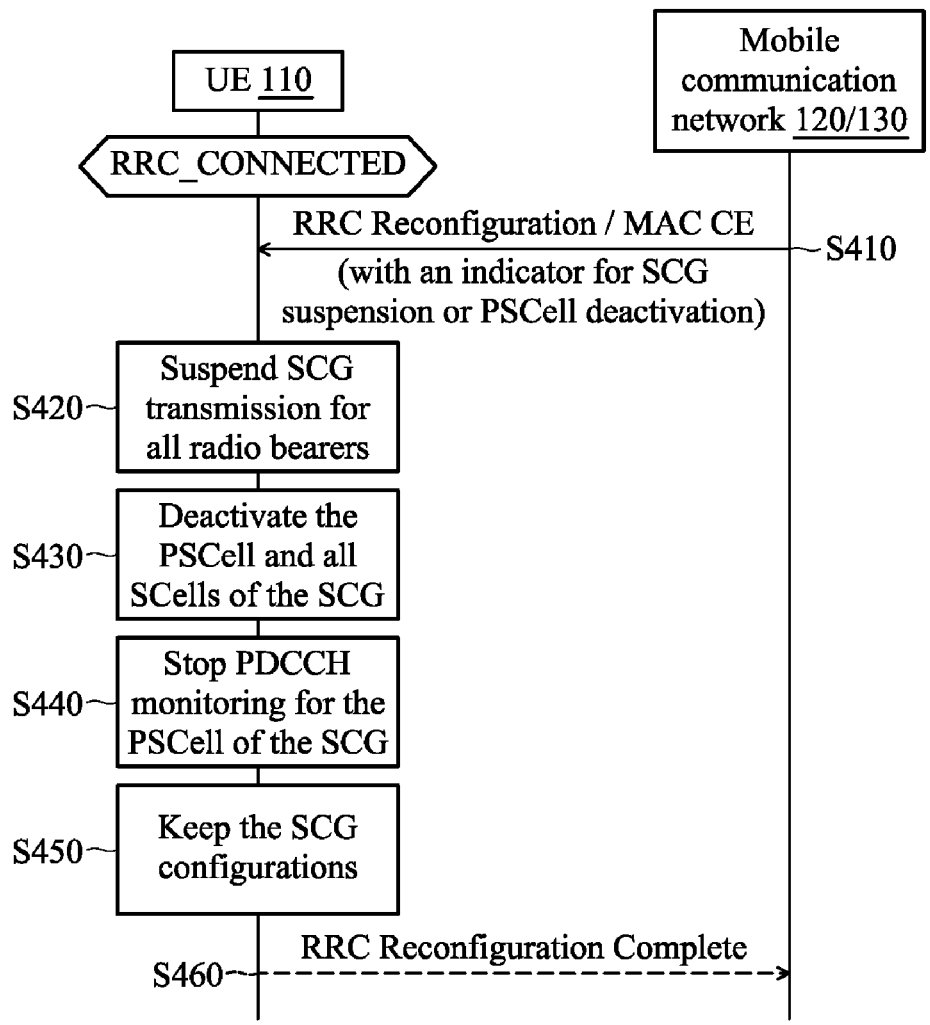
FIG. 4 is a message sequence chart illustrating SCG suspension or PSCell deactivation according to an embodiment of the application.

FIG. 4 is a message sequence chart illustrating SCG suspension or PSCell deactivation according to an embodiment of the application.

Initially, the UE 110 is configured to be in the RRC_CONNECTED mode and is communicatively connected to an SCG of the mobile communication network 120/130, wherein the SCG is not suspended.

In step S410, the UE 110 receives an RRC Reconfiguration message or a MAC CE including an indicator for suspension of the SCG or deactivation of a PSCell of the SCG from the mobile communication network 120/130.

In step S420, the UE 110 suspends SCG transmission for all radio bearers.

In step S430, the UE 110 deactivates the PSCell and all SCells of the SCG.

In step S440, the UE 110 stops PDCCH monitoring for the PSCell of the SCG.

In step S450, the UE 110 keeps the SCG configurations.

After that, the UE 110 stays in the RRC_CONNECTED mode.

Specifically, steps S420~S450 are performed in response to the RRC Reconfiguration message or the MAC CE including an indicator for suspension of the SCG or deactivation of the PSCell, but it should be understood that the order of these steps may vary depending on the implementation design without departing from the spirit of the invention.

In step S460, the UE 110 may send an RRC Reconfiguration Complete message to the mobile communication network 120/130, if an RRC Reconfiguration message is received in step S410.

Figure 5:
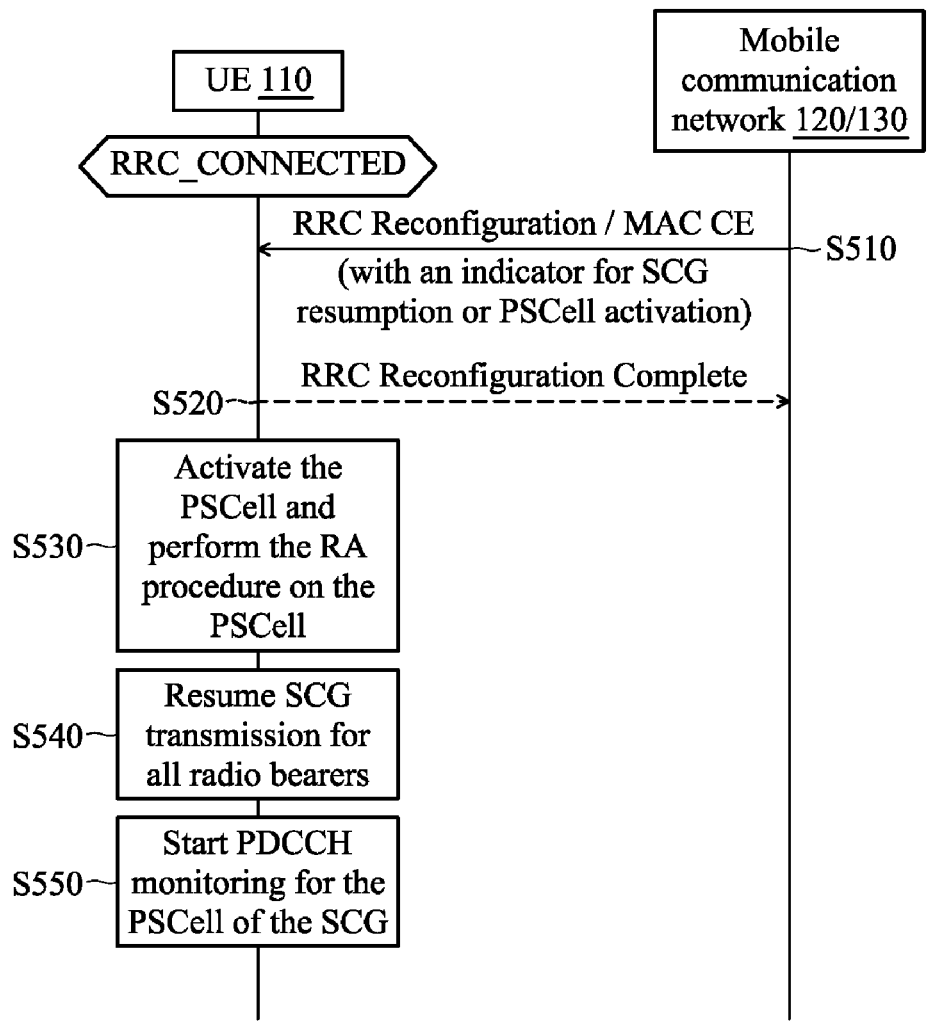
FIG. 5 is a message sequence chart illustrating SCG resumption or PSCell activation according to an embodiment of the application.

FIG. 5 is a message sequence chart illustrating SCG resumption or PSCell activation according to an embodiment of the application.

Initially, the UE 110 is configured to be in the RRC_CONNECTED mode and is communicatively connected to an SCG of the mobile communication network 120/130, wherein the SCG is suspended.

In step S510, the UE 110 receives an RRC Reconfiguration message or a MAC CE including an indicator for resumption of the SCG or activation of a PSCell of the SCG from the mobile communication network 120/130.

In step S520, the UE 110 may send an RRC Reconfiguration Complete message to the mobile communication network 120/130, if an RRC Reconfiguration message is received in step S510.

In step S530, the UE 110 activates the PSCell and performs the RA procedure on the PSCell.

In step S540, the UE 110 resumes SCG transmission for all radio bearers.

In step S550, the UE 110 starts PDCCH monitoring for the PSCell of the SCG.

After that, the UE 110 stays in the RRC_CONNECTED mode.

Figure 6:
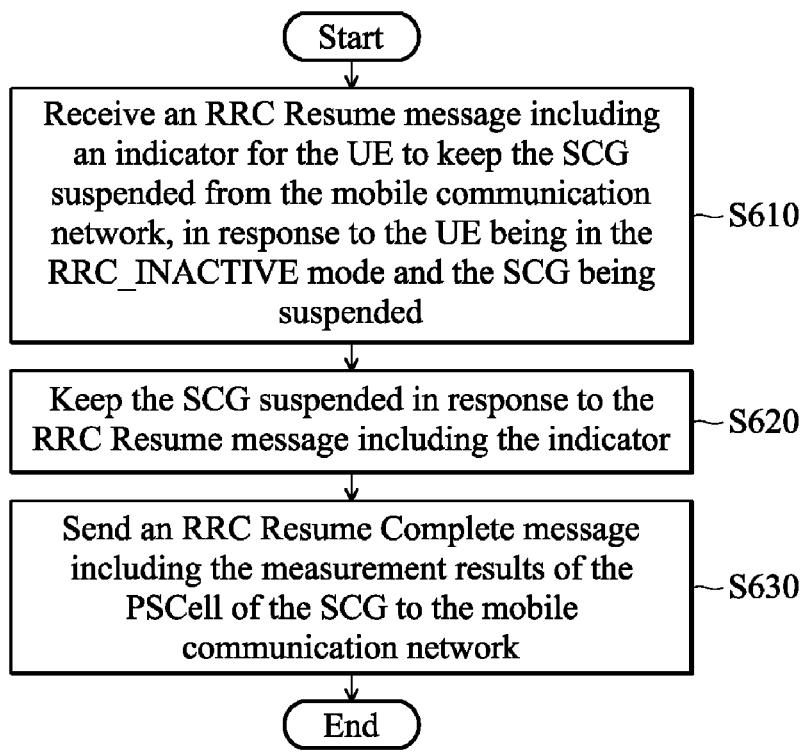
FIG. 6 is a flow chart illustrating the method for enabling SCG suspension during an RRC connection resume procedure according to an embodiment of the application.

FIG. 6 is a flow chart illustrating the method for enabling SCG suspension during an RRC connection resume procedure according to an embodiment of the application.

In this embodiment, the method may be applied to and executed by a UE (e.g., the UE 110) wirelessly and communicatively connected to an SCG of a mobile communication network (e.g., the mobile communication network 120/130). In particular, the UE is in the RRC_INACTIVE mode and the SCG is suspended.

In step S610, the UE receives an RRC Resume message including an indicator for the UE to keep the SCG suspended from the mobile communication network, in response to the UE being in the RRC_INACTIVE mode and the SCG being suspended.

Specifically, the indicator may be a new IE dedicated for indicating SCG suspension, in addition to the existing IEs defined for the RRC Resume message in compliance with the published 3GPP TS 38.331.

In step S620, the UE keeps the SCG suspended in response to the RRC Resume message including the indicator.

In step S630, the UE sends an RRC Resume Complete message including the measurement results of the PSCell of the SCG to the mobile communication network.

Specifically, the measurement results are obtained in the early measurement which is performed before starting the RRC connection resume procedure and is performed when the UE is in the RRC_INACTIVE mode.

It should be noted that the SCG remains suspended before the early measurement reporting is completed through the RRC Resume Complete message.

Figure 7:
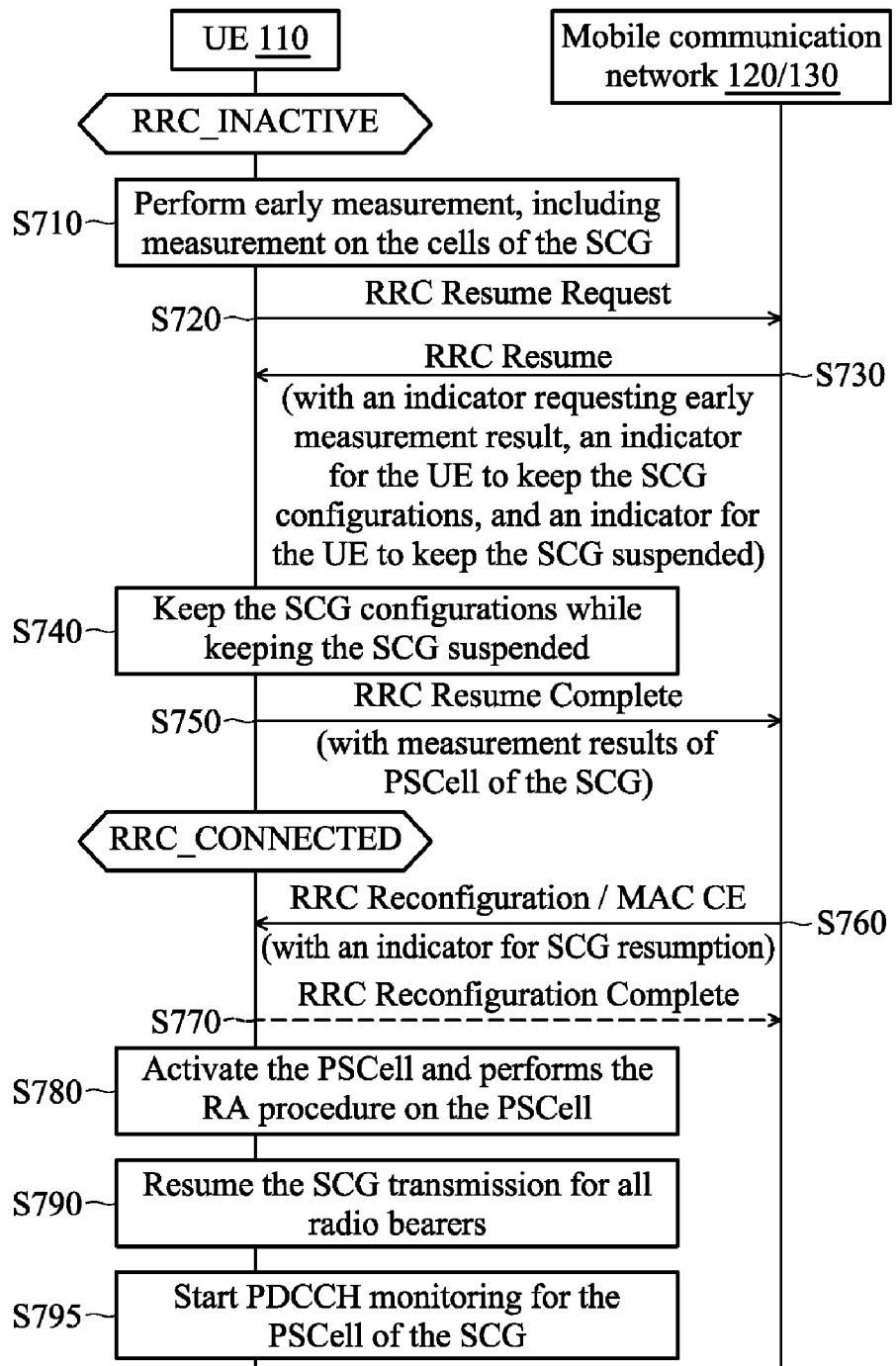
FIG. 7 is a message sequence chart illustrating SCG suspension during an RRC connection resume procedure according to an embodiment of the application.

FIG. 7 is a message sequence chart illustrating SCG suspension during an RRC connection resume procedure according to an embodiment of the application.

Initially, the UE 110 is configured to be in the RRC_INACTIVE mode and is communicatively connected to an SCG of the mobile communication network 120/130, wherein the SCG is suspended.

In step S710, the UE 110 performs early measurement, including measurement on the cells of the SCG.

In step S720, the UE 110 initiates the RRC connection resume procedure by sending an RRC Resume Request message to the mobile communication network 120/130.

In step S730, the UE 110 receives an RRC Resume message from the mobile communication network 120/130. Specifically, the RRC Resume message includes an indicator requesting early measurement result, an indicator for the UE to keep the SCG configurations, and an indicator for the UE to keep the SCG suspended.

In one embodiment, the indicator requesting early measurement result may be an idleModeMeasurementReq IE indicating that the UE 110 should report the idle/inactive measurement information, if available, to the mobile communication network 120/130 in an RRC Resume Complete message.

In one embodiment, the indicator for the UE to keep the SCG configurations may be a restoreSCG IE indicating that the UE should not release the SCG configurations.

In one embodiment, the indicator for the UE to keep the SCG suspended may be a new IE dedicated for indicating SCG suspension, in addition to the existing IEs defined for the RRC Resume message in compliance with the published 3GPP TS 38.331.

In step S740, the UE 110 keeps the SCG configurations while keeping the SCG suspended.

In step S750, the UE 110 sends an RRC Resume Complete message including the measurement results of the PSCell of the SCG to the mobile communication network 120/130, and enters the RRC_CONNECTED mode.

In step S760, the UE 110 receives an RRC Reconfiguration message or a MAC CE including an indicator for SCG resumption from the mobile communication network 120/130.

In step S770, the UE 110 may send an RRC Reconfiguration Complete message to the mobile communication network 120/130, if an RRC Reconfiguration message is received in step S760.

In step S780, the UE 110 activates the PSCell and performs the RA procedure on the PSCell.

In step S790, the UE 110 resumes the SCG transmission for all radio bearers.

In step S795, the UE 110 starts PDCCH monitoring for the PSCell of the SCG.

It should be noted that, in the conventional practice, the UE may have resumed the SCG transmission when receiving the RRC Resume message with the indicator for the UE to keep the SCG configurations. That is, at the time when the SCG transmission is resumed, the early measurement reporting is not yet completed, so the mobile communication network does not have sufficient information to decide if the SCG should be resumed or not. In other words, the SCG resumption may be referred to as blind SCG resumption and it may cause SCG transmission failure.

By contrast, in the embodiments of FIG. 6-7, the UE keeps the SCG suspended during the RRC connection resume procedure, and resumes the SCG transmission until an explicit command for SCG resumption is received from the mobile communication network after the RRC connection resume procedure is completed.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

The invention claimed is:

1. A User Equipment (UE), comprising:
  a wireless transceiver, configured to perform wireless transmission and reception to and from a Secondary Cell Group (SCG) of a mobile communication network; and
  a controller, configured to:
    in response to the UE being in an RRC_INACTIVE mode and the SCG being suspended, perform early measurement which includes measurement on the cells of the SCG and send a Radio Resource Control (RRC) Resume Request message to the mobile communication network to initiate a RRC connection resume procedure, wherein the early measurement is performed before starting the RRC connection resume procedure;
    in response to sending the RRC Resume Request message, receive a RRC Resume message comprising a first indicator for the UE to keep the SCG suspended and an idleModeMeasurementReq Information Element (IE) for requesting the result of the early measurement from the mobile communication network via the wireless transceiver;
    keep the SCG suspended in response to the RRC Resume message comprising the first indicator;
    send an RRC Resume Complete message comprising measurement results of a Primary Secondary Cell (PSCell) of the SCG to the mobile communication network via the wireless transceiver;
    configure the UE to enter an RRC_CONNECTED mode from the RRC_INACTIVE mode in response to sending the RRC Resume Complete message;
    after the UE enters the RRC_CONNECTED mode, receive an RRC Reconfiguration message or a Media Access Control (MAC) Control Element (CE) comprising a second indicator for resumption of the SCG from the mobile communication network via the wireless transceiver;
    resume SCG transmission for all radio bearers in response to the RRC Reconfiguration message or the MAC CE comprising the second indicator;
    activate the PSCell and performing a Random Access (RA) procedure on the PSCell in response to the RRC Reconfiguration message or the MAC CE comprising the second indicator; and
    start Physical Downlink Control Channel (PDCCH) monitoring for the PSCell in response to activating the PSCell.

2. A method, executed by a User Equipment (UE) communicatively connected to a Secondary Cell Group (SCG) of a mobile communication network, comprising:
  in response to the UE being in an RRC_INACTIVE mode and the SCG being suspended, performing early measurement which includes measurement on the cells of the SCG and sending a Radio Resource Control (RRC)

Resume Request message to the mobile communication network to initiate a RRC connection resume procedure, wherein the early measurement is performed before starting the RRC connection resume procedure;

in response to sending the RRC Resume Request message, receiving a RRC Resume message comprising a first indicator for the UE to keep the SCG suspended and an idleModeMeasurementReq Information Element (IE) for requesting the result of the early measurement from the mobile communication network;

keeping the SCG suspended in response to the RRC Resume message comprising the first indicator;

sending an RRC Resume Complete message comprising measurement results of a Primary Secondary Cell (PSCell) of the SCG to the mobile communication network;

entering an RRC_CONNECTED mode from the RRC_INACTIVE mode in response to sending the RRC Resume Complete message;

after entering the RRC_CONNECTED mode, receiving an RRC Reconfiguration message or a Media Access Control (MAC) Control Element (CE) comprising a second indicator for resumption of the SCG from the mobile communication network;

resuming SCG transmission for all radio bearers in response to the RRC Reconfiguration message or the MAC CE comprising the second indicator;

activating the PSCell and performing a Random Access (RA) procedure on the PSCell in response to the RRC Reconfiguration message or the MAC CE comprising the second indicator; and starting Physical Downlink Control Channel (PDCCH) monitoring for the PSCell in response to activating the PSCell.

* * * * *